(12) United States Patent
Børseth

(10) Patent No.: US 7,309,440 B2
(45) Date of Patent: Dec. 18, 2007

(54) METHOD FOR DESALINATION OF WATER AND REMOVAL OF CARBON DIOXIDE FROM EXHAUST GASES

(75) Inventor: Knut Erik Børseth, Tårnåsen (NO)

(73) Assignee: Sargas AS, Oslo (NO)

( * ) Notice: Subject to any disclaimer, the term of this patent is extended or adjusted under 35 U.S.C. 154(b) by 336 days.

(21) Appl. No.: 10/504,540

(22) PCT Filed: Feb. 14, 2003

(86) PCT No.: PCT/NO03/00059

§ 371 (c)(1),
(2), (4) Date: Aug. 13, 2004

(87) PCT Pub. No.: WO03/068685

PCT Pub. Date: Aug. 21, 2003

(65) Prior Publication Data

US 2005/0087496 A1   Apr. 28, 2005

(30) Foreign Application Priority Data

Feb. 15, 2002   (NO) .................................. 20020782

(51) Int. Cl.
*C02F 1/20* (2006.01)
(52) U.S. Cl. ..................... 210/710; 95/220; 95/236; 210/718; 210/737; 210/738; 210/770
(58) Field of Classification Search ................. 210/718
See application file for complete search history.

(56) References Cited

U.S. PATENT DOCUMENTS

| | | | | |
|---|---|---|---|---|
| 3,741,890 A | * | 6/1973 | Smith et al. ................. | 210/667 |
| 3,927,838 A | * | 12/1975 | Soloviev et al. ......... | 241/46.15 |
| 4,291,549 A | * | 9/1981 | Fujimura et al. ............. | 62/534 |
| 5,084,187 A | * | 1/1992 | Wilensky ..................... | 210/768 |
| 5,360,554 A | * | 11/1994 | Sloan et al. ................. | 210/768 |
| 5,614,102 A | * | 3/1997 | Sakurada ..................... | 210/718 |
| 6,180,012 B1 | * | 1/2001 | Rongved ..................... | 210/717 |
| 6,235,092 B1 | * | 5/2001 | Spencer ....................... | 96/242 |
| 6,720,359 B2 | * | 4/2004 | O'Rear et al. ............. | 518/702 |
| 7,037,434 B2 | * | 5/2006 | Myers et al. ................ | 210/718 |

* cited by examiner

Primary Examiner—Peter A. Hruskoci
(74) Attorney, Agent, or Firm—Rothwell, Figg, Ernst & Manbeck

(57) ABSTRACT

This invention relates to a method for desalination of seawater (5, 30) and separation of $CO_2$ from exhaust (77) from a gas turbine (7). LNG (4) is fed into a heat exchanger (6) in which it receives heat from seawater (5) and heat from steam (27) from an exhaust boiler, and heat from combustion air (3) via a line to an air inlet (33) of said gas turbine (7), for evaporating LNG (4) to gas which is fed to a gas export module (10) and to a fuel gas skid (8) for supplying said gas turbine (7) with fuel. Thus said combustion air (3, 28) at the air inlet to said gas turbine (7) obtains a lowered temperature and increases an efficiency of said gas turbine (7). Said $CO_2$-rich exhaust gas (77) from said gas turbine (7) is fed into a process unit (17) having an inlet (35*a*) with a fan (35*b*) and an outlet for $CO_2$-reduced exhaust (13). Said cooled seawater from said heat exchanger (6) is fed into said process unit (17) via a coaxial feed pipe (67) for seawater and $NH_4OH$ arranged in said process unit (17). $NH_4OH$ is fed into said coaxial feed pipe (67) and is then mixed with said cooled seawater (30) and released via a series of nozzles in several vertical levels from said feed pipe (67) to said process unit's (17) upwards flowing, rotating exhaust (77). By this device a good mixture of $NH_4OH$-containing salt water and $CO_2$-rich exhaust is achieved, for formation of $NaHCO_3$, $NH_4Cl$, and fresh water.

36 Claims, 4 Drawing Sheets

US 7,309,440 B2

METHOD FOR DESALINATION OF WATER AND REMOVAL OF CARBON DIOXIDE FROM EXHAUST GASES

CROSS REFERENCE TO RELATED APPLICATION

This application is a 35 U.S.C. § 371 National Phase Entry Application from PCT/N003/00059, filed Feb. 14, 2003, and designating the U.S.

FIELD OF THE INVENTION

The invention relates to an improved process for removal of $CO_2$ from exhaust gases, in which huge amounts of seawater are transformed to fresh water by addition of ammonia $NH_3$ with subsequent precipitation of sodium hydrogen carbonate $NaHCO_3$ and ammonium chloride $NH_4Cl$. The process is made more efficient by using air, seawater and steam as heat sources during evaporation of liquefied natural gas (LNG). Cooled air is provided for the air inlet of a gas turbine, a feature that considerably improves the efficiency. Cooled seawater is used for removal of $CO_2$ from the exhaust gas from the gas turbine. This process is made more efficient by having a low seawater temperature; about 10° C. Steam is generated in the exhaust boiler of the gas turbine. The gas turbine generates electrical power for running the process that is necessary for evaporation of LNG. The excess electrical power is exported.

BACKGROUND OF THE INVENTION

Precipitation of $NaHCO_3$ and $NH_4Cl$ as described above is, in its basic principle, known as the Solvay soda process, which has been industrially dominating for a long time. Further we refer to U.S. Pat. No. 6,180,012 describing a closed tank in which enters $CO_2$-rich exhaust and seawater (with NaCl) and in which separately ammonia $NH_3$ is injected, and fresh water is formed. Sodium hydrogen carbonate $NaHCO_3$ and ammonium chloride $NH_4Cl$ precipitate to the bottom and are separated from seawater, which is transformed to fresh water.

It may be inefficient not to mix salt water and ammonia $NH_3$ before the injection into the chamber, as the process described in U.S. Pat. No. 6,180,012, because the components $NH_3$ and NaCl may not have sufficient time to be effectively mixed before further reaction with $CO_2$ in the exhaust gas. Further, it is a disadvantage of the U.S. Pat. No. 6,180,012 that the injection takes place only in a limited upper portion of the tank, and not a more thorough mixing, e.g. in a more extensive portion of the tank. It is a further disadvantage of the U.S. Pat. No. 6,180,012 that the process takes place with inlet of an exhaust gas to a closed tank, because the closed tank will form a counter pressure against the outlet from the gas turbine, and thus there is a risk of a considerable reduction of the gas turbine efficiency.

A typical gas turbine of 25 Megawatt (MW) generates an exhaust flow of about 3,3 kg/s of $CO_2$. That represents a large and undesirable production of $CO_2$ considering the probable contributions to greenhouse effects on the global atmosphere. Further, we expect that the unified process according to the invention also will prove commercially healthy because several countries may incur official $CO_2$-fees and/or trade $CO_2$ emission permissions, so-called "green certificates".

The process according to a preferred embodiment of the invention has its greatest potential in those parts of the world in which there is a lack of fresh water, e.g. in the Middle East, Western Africa, The Read Sea, etc. One of the main purposes of the invention is to contribute to the use of liquefied natural gas (LNG), seawater and ammonia for an electricity production of significantly reduced $CO_2$-emission, and evaporation of LNG simultaneously with soda production and fresh water production, in which all the products have a sales value. Considering that the invention also improves the efficiency of the electricity production from the gas turbine, by cooling the air to the gas turbine by means of LNG, the invention represents an essential improvement for efficient use of the Solvay process. Further, the process is dependent of low sea water temperature in order to achieve efficient removal of $CO_2$, about 10° C. There is a potential incompatibility in the facts that the seawater temperatures rarely are low in those coastal areas of the world in which there is a lack of fresh water for agricultural purposes or alternatively industrial purposes. Further, there is a potential incompatibility in the facts that evaporation of LNG requires a high seawater temperature, whereas the removal of $CO_2$ requires a low seawater temperature. The preferred embodiment of the present invention aims at combining these seemingly counteractive effects, thereby creating an improved process that should be commercially applicable and having a large market potential, particularly in those areas mentioned above.

An article called "Chemical Separation Process for Highly Saline Water, 1. Parametric Experimental Investigation" in Ind. Eng. Chem. Res., 1996, 35, 799-804, describes the separation of highly saline waters under various conditions and is carried out using a partial-desalting process. The method utilizes a series of chemical reactions involving conversion of Sodium Chloride, the major constituent in saline waters, into sodium bicarbonate, which precipitates under the experimental conditions, and ammonium chloride, which can be separated by crystallization. Experiments of absorption of carbon dioxide in an ammoniated brine have demonstrated the efficiency of the method.

SUMMARY OF THE INVENTION

The invention is a method for desalination of salt water, preferably seawater, and separation of $CO_2$ from a $CO_2$-rich exhaust gas from a fuel combustion engine or gas turbine, comprising the following steps:

LNG is fed into a heat exchanger in which heat is taken from seawater and heat from steam from a steam turbine, and heat from combustion air via a line to the air inlet to a gas turbine, for evaporating LNG to gas being fed to a gas export module and to a fuel gas skid for providing the gas turbine with fuel;

In which the combustion air, which at the air supply to the gas turbine thus has a lowered temperature, and thus increases the efficiency of the gas turbine;

In which $CO_2$-rich exhaust gas from the gas turbine is led into a chamber or process unit having an inlet with a fan and an outlet for $CO_2$-removed exhaust;

In which the cooled salt water from the heat exchanger is fed into the process unit via an upper swivel having vanes that rotates a coaxial feed pipe for seawater and $NH_4OH$, said coaxial pipe being arranged preferably in a centre line in said process unit;

In which $NH_4OH$ is fed in via a lower swivel of said insert coaxial pipe and mixed and released with the cooled salt water a series of nozzles at several vertical levels from the coaxial pipe to the upwards streaming and rotating exhaust through the process unit, in order to achieve a good mixture of NH$_4$OH-containing salt water and CO$_2$-rich exhaust, for formation of NaHCO$_3$, NH$_4$Cl, and H$_2$O.

The invention is also a process unit for removing CO$_2$ from an exhaust from a combustion engine or gas turbine, comprising the following features:

an inlet with a fan and an outlet for exhaust of reduced CO$_2$ content;

in which cooled salt water can be piped into said process unit via an upper swivel having vanes for rotating a coaxial pipe, said coaxial pipe for seawater and NH$_4$OH feed, said coaxial feed pipe being arranged preferably in a centre line of said process unit;

in which NH$_4$OH can be guided in via a lower swivel on said coaxial pipe and mixed with said cooled salt water and released via a series of nozzles from said feed pipe, said nozzles arranged in several vertical levels, to upwardly flowing and rotating exhaust of said process unit;

thus for achieving a mixture of NH$_4$OH-containing salt water and CO$_2$-rich exhaust for formation of NaHCO$_3$, NH$_4$Cl and desalinated water.

BRIEF DESCRIPTION OF THE FIGURES

Attached are figure drawings made for illustrating a preferred embodiment of the invention. However, the figure drawings are not meant for being construed as limiting to the invention, which shall be limited by the attached claims only.

DETAILED DESCRIPTION OF THE INVENTION

Figure 1:
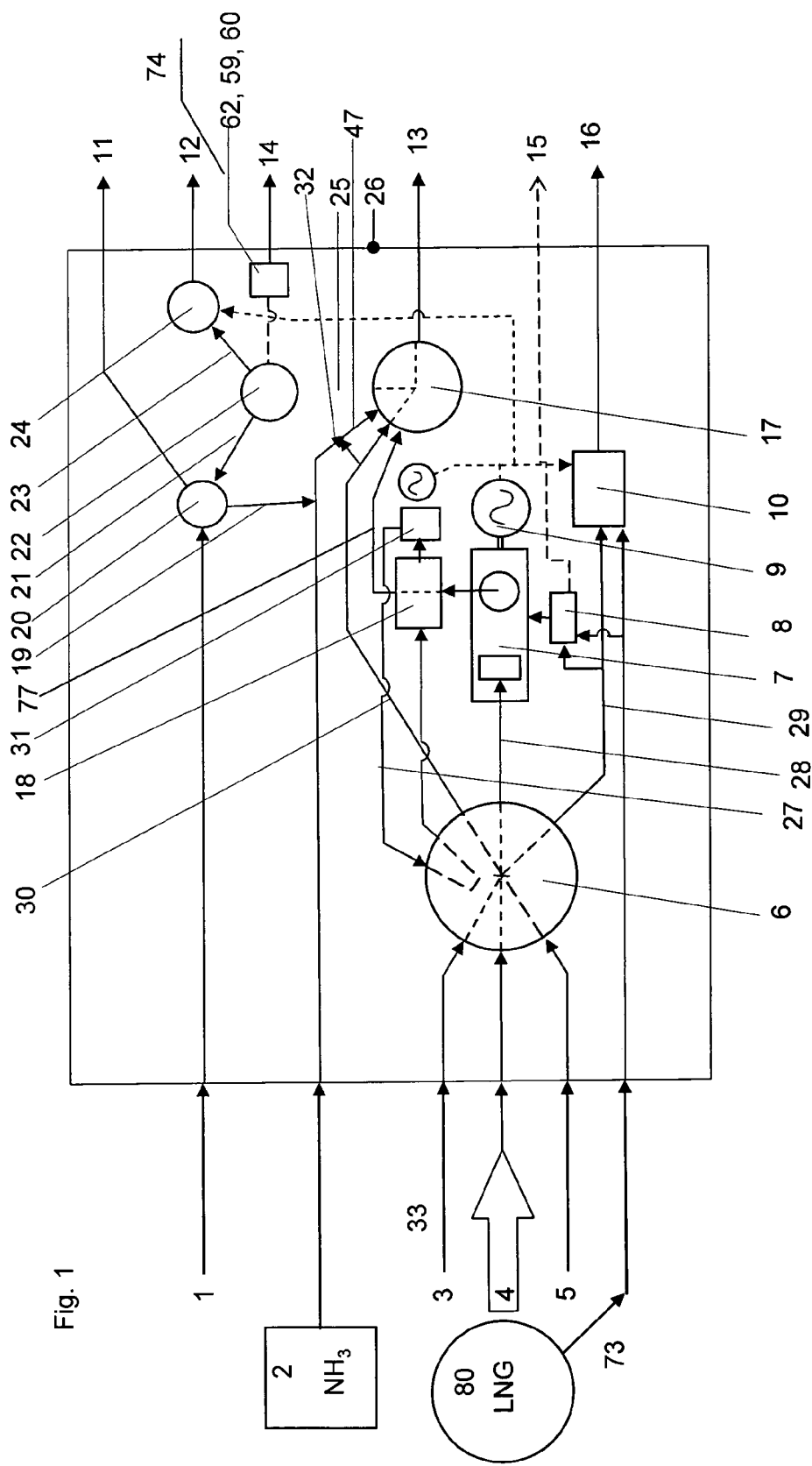
FIG. 1 illustrates a plan section of the terminal limits or process area, and illustrates in-flowing fluids and dry matter to the process from the left side in the drawing, with products from the products at the right side in the drawing.

In the drawing figures a partially converted petroleum oil tanker is used as process unit. It is not a condition of the invention that such converted tankers are used, but second hand tankers are cheap and entirely useful under protected conditions, e.g. in an import harbour for LNG for which one requirement may be a protected harbour.

FIG. 1 illustrates a plan section of the terminal limits or process area 26, and illustrates in-flowing fluids and dry matter to the process from the left side in the drawing, with products from the products at the right side in the drawing. From the left side are illustrated in-flowing fluids and dry components as follows: Chalk Ca(OH)$_2$ (1) is sent to the process unit for regenerating of ammonia NH$_3$ (19), which will be explained below. Ammonia (2) is sent to a mixing unit for seawater and ammonia, for formation of NH$_4$OH for injection via an insert feed pipe (67) to a process unit (17) for removal of CO$_2$ from exhaust gas (77) from a gas turbine (7), resulting in release of cleaned exhaust gas (13) to the atmosphere. Central for the preparation to the process is one or more heat exchangers (6). Combustion air of ambient temperature, e.g. 20-35° C., is led into the heat exchanger. Liquefied natural gas (LNG) (4) from an LNG-storage tank (80) outside of the system, is piped into the heat exchanger (6) while having a temperature of about −163° C. LNG (4) receives heat from the combustion air (3), and from seawater (5) and from steam from the exhaust gas steam boiler (18), steam of which is also piped through the heat exchanger. The paths of those fluids through the heat exchanger are better illustrated in FIG. 1. Boil-off gas (73) from the storage tank (80) may also be guided in through the heat exchanger if heating is needed before it is fed into the gas skid module (8) to constitute fuel for the gas turbine (7). Possible excess boil-off gas (73) may be fed into a line (29) to a gas export module (10).

The heat exchanger (6) is arranged before the gas turbine (7) and the process unit (17) constituting an exhaust process tower (17) for adsorbing CO$_2$ from the exhaust, leading further to a precipitation process unit for fresh water at the right side of the drawing.

The process is, according to a preferred embodiment, a method for desalination of salt water (5), which may be seawater or brackish water, with separation of CO$_2$ from a CO$_2$-rich exhaust (77) from a combustion engine, boiler or gas turbine (7). The process comprises the following steps:

LNG (4) is fed into the heat exchanger (6) in which it receives heat from the seawater (5) and heat from steam (27) from a steam turbine (31), and also heat from combustion air (3) sent via a line (28) to the air inlet (33) to the gas turbine (7). LNG (4) will then receive heat and evaporate to gas (29) that is led to a gas export module (10) and to a fuel gas skid (8) for providing the gas turbine (7) with fuel. The combustion air (28) at the air inlet (33) to the gas turbine (7) thereby is lowered in temperature out of the heat exchanger due to being cooled down by LNG (4), and thus increases the efficiency of the gas turbine (7).

Figure 2:
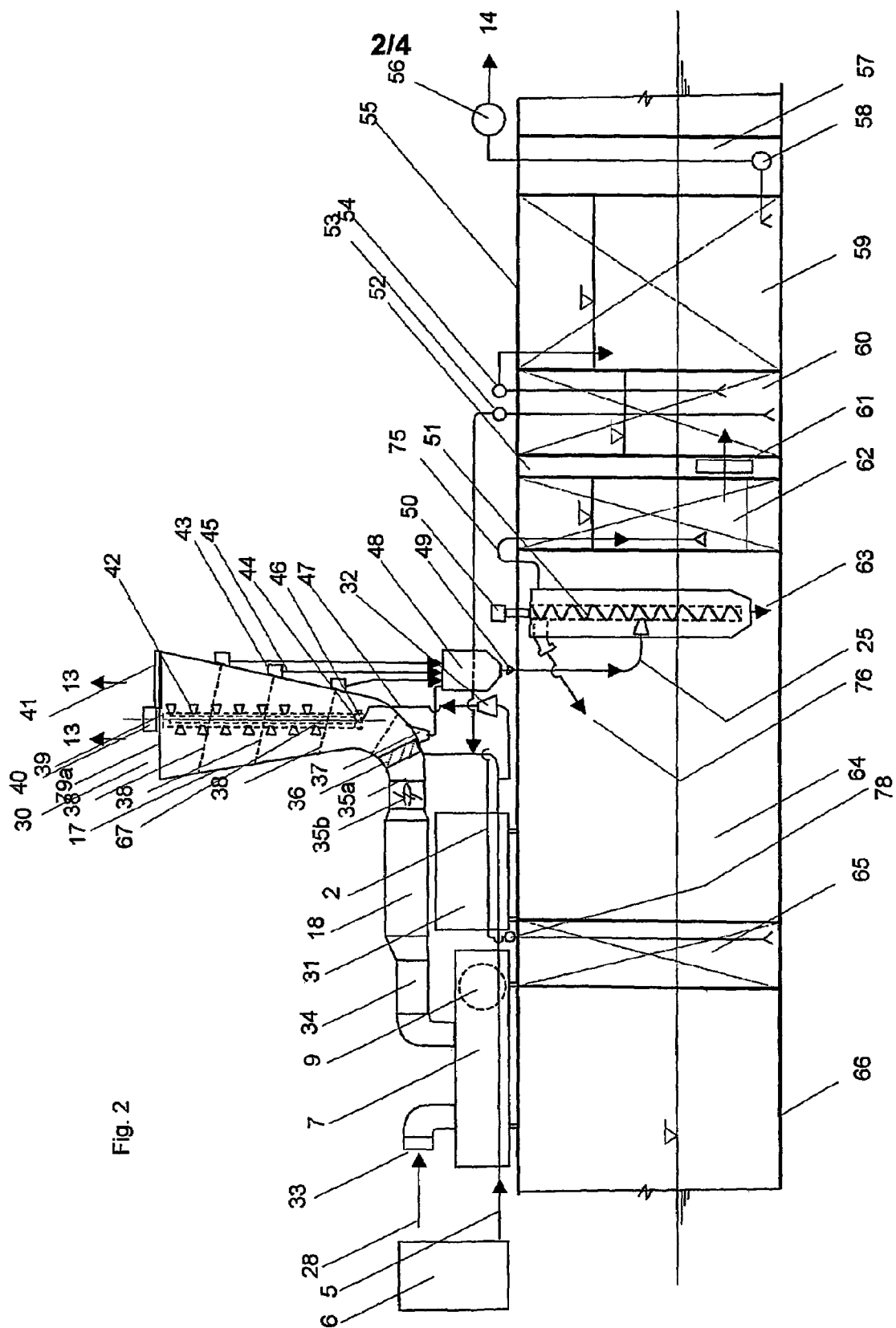
FIG. 2 illustrates a side view of an embodiment of the invention, here shown mounted upon a ship hull. The process tower and the separation unit for fresh water are shown below the deck.
Figure 4:
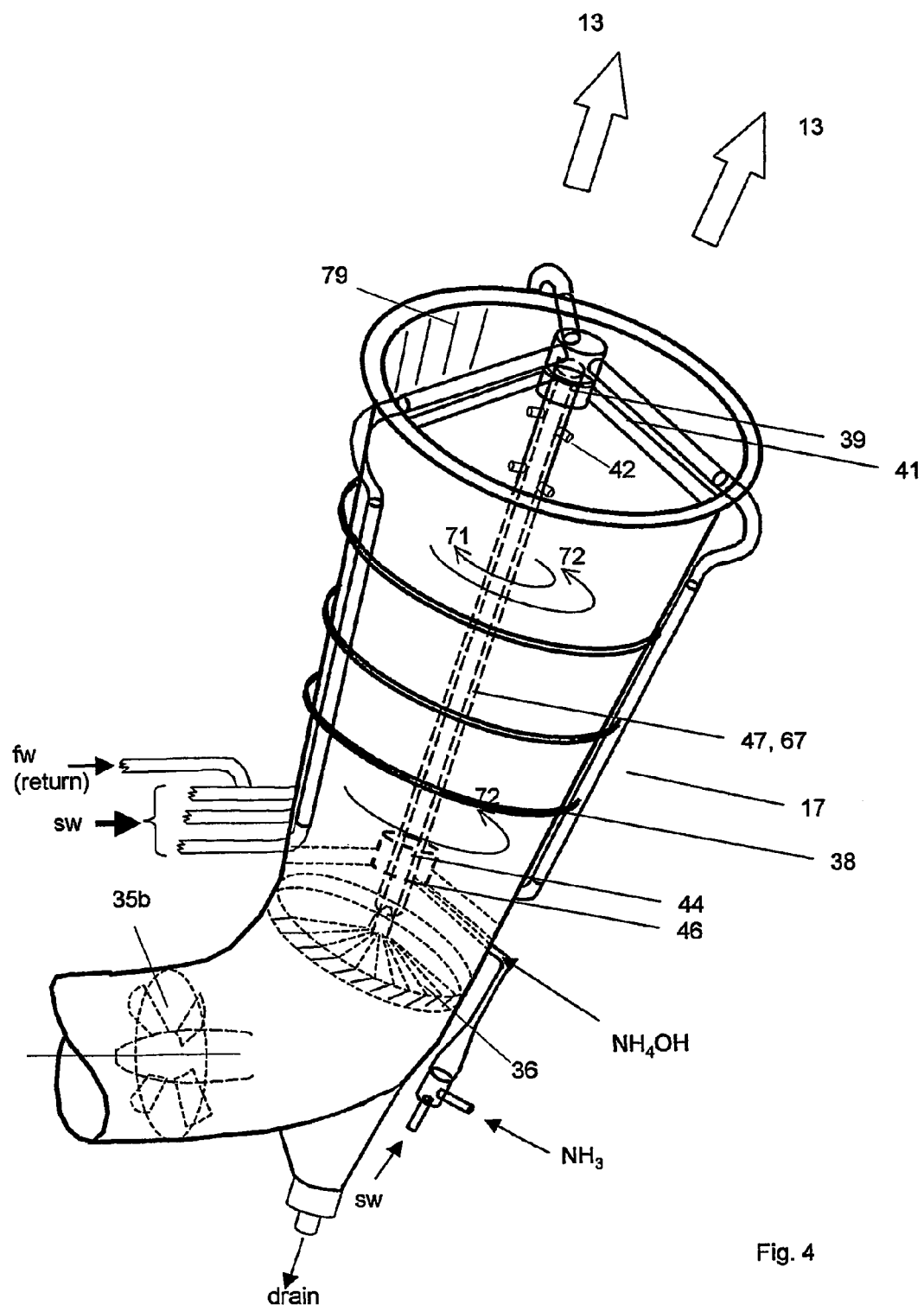
FIG. 4 is a perspective view as seen from above of an embodiment of the invention of the process tower between the fan inlet and up to the outlet of the CO$_2$ lean exhaust.

Referring to FIGS. 2 and 4, CO$_2$-rich exhaust gas (77) from the gas turbine (7) is led into a chamber rather called a process unit (17) having an inlet (35*a*) provided with a fan (35*b*) in the lower portion of the process unit (17), and an outlet (74) for CO$_2$-removed exhaust (13) at the upper end of the process unit (17).

Figure 3:
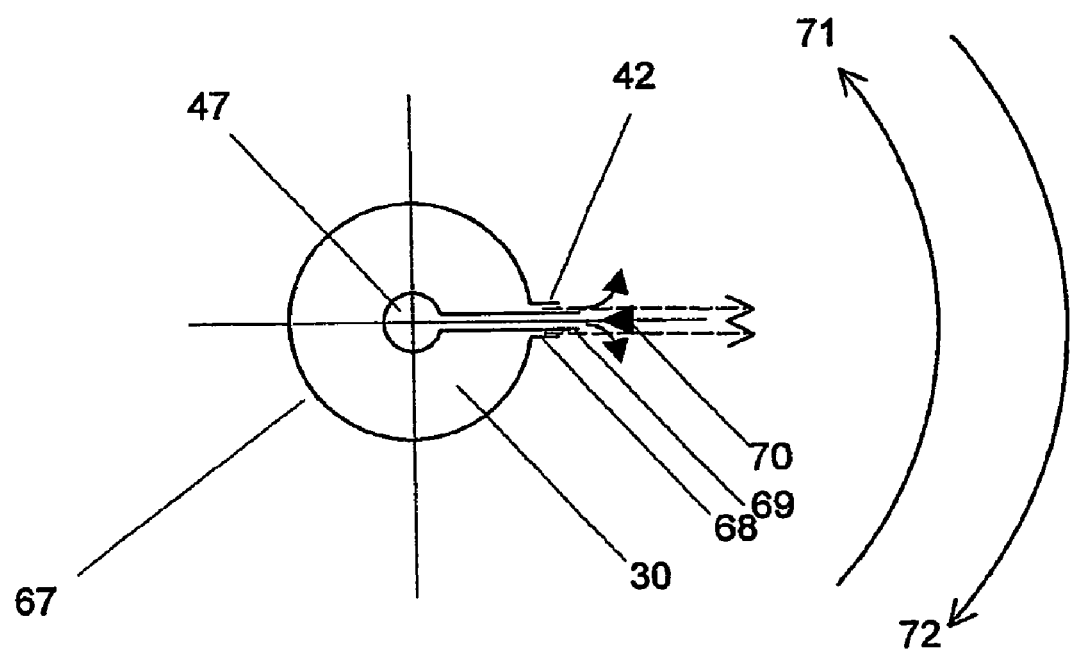
FIG. 3 is a horizontal view of a rotating swivel for sea water and NH$_4$OH which in an embodiment of the invention is mounted standing in the middle of the process tower for the the separation of CO2 from the exhaust.

The cooled salt water (30) from the heat exchanger (6) is fed into the process unit (17) via an upper swivel (40) having vanes that rotate an insert coaxial pipe (67) for seawater and NH$_4$OH in a desired direction (71) being opposite of the desired rotation direction (72) (See FIGS. 3 and 4) for the exhaust gas, and preferably being arranged along the centre line inside the process unit (17). This increases the degree of mixing between the seawater mixture and the exhaust gas considerably compared to the U.S. Pat. No. 6,180,012.

NH$_4$OH is led in through a lower swivel (46) on the coaxial pipe (67). (See FIGS. 2 and 4). NH$_4$OH is mixed with the cooled salt water (30) and flushed out into the process unit (17) via a series of radially directed nozzles (42) at several vertical levels from the coaxial pipe (67) to the upwardly flowing, rotating exhaust (77) through the process unit (17). As the exhaust (77) is reduced in CO$_2$ during the continuous chemical process, we name it CO$_2$-lean exhaust (13). By means of the rotating nozzles and the oppositely rotating exhaust, a good mixing of NH$_4$OH-rich salt water and CO$_2$-rich exhaust (77) is achieved, for formation of NaHCO$_3$, NH$_4$Cl, and H$_2$O.

According to a preferred embodiment of the invention the process unit (17) has a diameter increasing with increased elevation from the lower inlet (35*a*) to the upper outlet (74). As shown in FIGS. 2 and 4, drain gutters (38) to drains (43)

are arranged, leading to outlets (45) to a collecting tank (48) for NaHCO$_3$, NH$_4$Cl, and fresh water.

According to a preferred embodiment of the invention, which differs essentially from the mentioned U.S. Pat. No. 6,180,012 is an exhaust fan (35B) forcing forward the exhaust (77) and thus reduces the counter pressure for the gas turbine (7) so as to compensate the pressure drop through the process unit (17) in order to maintain the efficiency of the gas turbine. The exhaust fan (35B) initiates at the same time a rotation of the exhaust gas (77), further reinforced by means of fixed guide vanes (36) arranged downstream at the inlet (35a) of the process unit (17).

According to the preferred embodiment of the invention as shown in FIGS. 2 and 4, NH$_4$OH enters through the lower swivel (46) to a central coaxial inner pipe (47) in the coaxial feed pipe (67) in the process unit (17). The inner pipe (47) is surrounded by a mantle of salt water (30) through which NH$_4$OH is led out through pipes to sea water ring nozzles (42) in the feed pipe (67). In the nozzles (42) NH$_4$OH and seawater are mixed through flushing from the nozzles to the CO$_2$-rich exhaust (77) gradually being changed to CO$_2$-lean exhaust (13) on its way upward through the process unit (17). The nozzles are preferably provided with NH$_4$OH-radial distributors (70) arranged just outside the nozzles (42) in order for NH$_4$OH to be forced out through an enveloping flow of the mixed cooled seawater (30). This implies two essential advantages relative to U.S. Pat. No. 6,180,012 in that ready-mixed droplets of NH$_4$OH are flushed out towards the NaCl-molecules and contribute to weaken the molecular binding between Na and Cl, thus facilitating formation of NaHCO$_3$ as one of the end products.

Precipitated material of NaHCO$_3$, NH$_4$Cl intermediately dissolved in H$_2$O are conducted to a precipitator (22) for separation of NaHCO$_3$ and NH$_4$Cl from the water H$_2$O which is generally pure fresh water if the process is thoroughly controlled and low temperature of the seawater is maintained.

According to a preferred embodiment of the invention the precipitator (22) is vertically standing and cylindrical, and has a rotation-inducing tangential inlet (25B) for NaHCO$_2$/NH$_4$Cl dissolved in water. The driving pressure is generated from the pressure head from the collector tank (48) to the inlet (25B). NaHCO$_2$/NH$_4$Cl is precipitated by the rotation and the gravitation towards the bottom of the precipitator (22).

According to a preferred embodiment of the invention fresh water (74) is taken out through a fresh water overflow pipe (75) to a fresh water filter tank (62). The fresh water (74) from the filter tank (62) is sent through a filter (61) to a distribution- and settling tank (60). Salt water may be present at the bottom of the settling tank (60), of which salt water may be lifted back to the seawater pipe (30) by means of the pump (53). Fresh water (74) is pumped by means of the pump (54) to storage tank (59), and further from storage tank (59) via discharge pump (58) and booster pump/export pump (56) to an export pipeline (14).

The precipitated NH$_4$Cl and NaHCO$_3$ is lifted by means of a screw pump or "Archimedes screw" (51) that is driven by a motor (50), to an outlet (76) from the precipitator (22) to a refining process compartment (64). Chalk Ca(OH)$_2$ (1) is led into the process unit (20) for regeneration of ammonia NH$_3$ that is fed via a pipe (19) to be mixed with additional NH$_3$ (2) from the ammonia tank (65). The ammonia (2, 19) is led further to the mixing unit (32) mixing salt water and ammonia (2, 19) and pumps the mixture NH$_4$OH into the feed pipe (67) in the process unit (17).

According to a preferred embodiment of the invention, the gas turbine (7) drives a generator (9) for generating electrical energy that partially may be exported as energy (15), and partially to be used for pumping work, gas and/or CO$_2$ export work, and heating a process unit (24) that precipitates soda/Na$_2$CO$_3$ (12) for export, and CO$_2$ and fresh water, which are exported or returned to the process.

COMPONENTS LIST

1 Ca(OH)$_2$—limestone
2 NH$_3$—ammonia
combustion air to gas turbine(s), e.g. 20° C. before the heat exchanger, and after the heat exchanger in to the gas turbine holding 5° C.
4 liquefied natural gas (LNG), −163° C., (1,2 mill. tons/year.
5 seawater—250 000 m3/day, e.g. 15° C. in to the heat exchanger, and about 5° C. out from the heat exchanger, and further to the rotating feed pipe (67)
6 heat exchanger, (possibly several in parallel).
7 gasturbine(s), (120 MW)
8 gas skid module, for treating gas supply to the gas turbine, (pressurizing, drying and filtering)
9 generator
10 gas export module (needs 25 MW power to deliver 131 MSC FTD (Mill. dard Cubic Ft./day (evaporated) LNG/year)
11 CaCl$_2$—drying agent
12 Na$_2$CO$_3$—soda
13 exhaust out of the process, low in CO$_2$—contents
14 fresh water about 250000 m$^3$/day
15 electrical energy for export.
16 gas export from the gas export gas export module 10
17 process unit, for adsorption of CO$_2$ from exhaust
18 exhaust boiler from turbine 7 for generating steam
19 regenerated NH$_3$—ammonia
20 process unit for regenerating NH$_3$
21 ammonium chloride solution NH$_4$Cl
22 process unit for precipitation of sodium hydrogen carbonate NaHCO$_3$ and ammonium chloride NH$_4$Cl from water
23 sodium hydrogen carbonate NaHCO$_3$
24 process unit for precipitation of soda Na$_2$CO$_3$.
25 NaHCO$_3$ and NH$_4$Cl—solution pipe
25B tangential inlet to process unit (22) for precipitation
26 terminal border (extent of the area)
27 steam to heat exchanger (condenser)
28 combustion air to gas turbine (see (3)), about 5° C.
29 gas to gas export module 10 and to fuel gas skid 8
30 seawater to process unit cooled to about 5° C. out from heat exchanger 6
31 steam turbine
32 mixer for seawater and ammonia NH$_3$
33 air inlet to gas turbine
34 muffler (sound attenuator) out from gas turbine
35A inlet to process unit (17) from exhaust fan (35b)
35B exhaust fan
36 exhaust lead vanes for reinforcing rotation of exhaust gas (77) of high CO$_2$-contents
37 drain at lower portion of the process unit (17)
38 guide gutter to drain (43)
39 horizontal and vertical bearing for the rotating coaxial pipe (67)
40 swivel for injection of cooled sea water (30), with guide vanes for rotating the insert feed pipe (67)41 support beams (3 ex) for the feed pipe (67)
41 support beams (3 ex) for the coaxial pipe (67)

42 nozzles for NH₄OH and seawater
43 drain from guide gutter (38)
44 horizontal bearing for the rotating feed pipe (67)
45 drop line from the drain (43) to the collector tank (48) for NaHCO₃ and NH₄Cl—solution
46 swivel for NH₄OH solution
47 supply line for NH₄OH to swivel (46) with rotating coaxial pipe (67) with nozzles (42)
48 collecting tank for NaHCO₃ and NH₄Cl—solution (25)
49 choke valve at outlet form collector tank (48)
50 motor for screw (archimedes screw) on lift pump (51)
51 screw lift pump
52 cofferdam between tanks
53 lift pump for salt-containing water from bottom portion of the distribution/settling tank (60).
54 lift pump for fresh water from distribution/settling tank (60) to fresh water age tank (59)
55 main deck of (converted) crude oil tanker
56 export booster pump (s) for fresh water
57 pump compartment
58 discharge pump, pressure support to export pump (56)
59 fresh water storage tank
60 distribution tank/settling tank
61 filter between filter tank (62) and distribution/settling tank (60)
62 filter tank
63 drain from precipitation process unit (22)
64 process compartment for precipitated material (76)
65 tank for NH₃ ammonia
66 bottom of (converted) crude oil tanker
67 rotating coaxial feed pipe for NH₄OH and seawater
68 ring nozzle for sea water (30) in rotating coaxial pipe (67)
69 nozzles for NH₄OH on pipe from coaxial supply line (47) in the rotating coaxial pipe (67) in the process unit (17)
70 radial distributor for NH₄OH outside of the nozzle (69)
71 rotation direction for the coaxial pipe (67)
72 rotation direction for the exhaust (77)
73 boil-off gas from 1 ng storage tank
74 fresh water from the distribution/settling tank (60)
75 overflow pipe for water from the separation/process unit (22)
76 outlet of precipitated material sodium hydrogen carbonate NaHCO₃ and ammonium chloride NH₄Cl
77 exhaust having a high CO₂—content, in to the process unit (17) from the gas turbine (7)
78 lift pump from the tank (65) which delivers to the mixer (32)
79 turbulence attenuating ribs
79A outlet for exhaust removed of CO₂
80 LNG storage tank outside the process plant

The invention claimed is:

1. A method for desalinating salt water (5), and for removing CO₂ from a CO₂-rich exhaust (77) from a combustion engine or gas turbine (7), comprising the following steps:
    liquefied natural gas (LNG) (4) is fed into a heat exchanger (6) in which said LNG (4) receives heat from the following sources:
    said salt water (5) that becomes cooled salt water (30); and
    steam (27) generated from a steam turbine (31); and
    combustion air (3) from the atmosphere, which is provided via a line (28) to an air inlet (33) of said combustion engine or gas turbine (7);
    said heat exchanger (6) evaporating said LNG (4) to gaseous form (29), said gaseous form (29) being guided to a gas export module (10); and to
    a fuel gas skid (8) for supplying fuel to said combustion engine or gas turbine (7);
    in which said combustion air (28) which, at said air inlet (33) to said combustion engine or gas turbine, has a lowered temperature relative to said combustion air (3) and thus increases the efficiency of said combustion engine or gas turbine (7);
    in which CO₂-rich exhaust (77) from said combustion engine or gas turbine (7) is guided into a process unit (17) having an inlet (35a) with a fan (35b) and an outlet (79a) for exhaust (13) of reduced CO₂ content;
    in which said cooled salt water (30) from said heat exchanger (6) is conveyed into said process unit (17) via an upper swivel (40) having vanes for rotating a coaxial feed pipe (67), said coaxial feed pipe (67) for distributing seawater and NH₄OH feed, said coaxial feed pipe (67) being arranged in a center line of said process unit (17);
    in which NH₄OH is fed via a lower swivel (46) on said coaxial feed pipe (67) and mixed with said cooled salt water (30) and released via a series of nozzles (42) from said coaxial feed pipe (67), said nozzles (42) arranged in several vertical levels, to upwardly flowing and rotating exhaust (77) of said process unit (17);
    thus achieving a mixture of NH₄OH-containing salt water and CO₂-rich exhaust (77) for formation of NaHCO₃, NH₄Cl and desalinated water.

2. The method according to claim 1, wherein said process unit (17) has an increasing diameter with increasing elevation from said inlet (35a) to said outlet (79a), and with draining guide gutters (38) to drains (43) leading to outlets (45) and further to a collector tank (48) for the process unit's (17) products NaHCO₃, NH₄Cl and fresh water.

3. The method of claim 2, wherein said fan (35b) reduces a counter pressure on said combustion engine or gas turbine (7) so that a pressure drop through said process unit (17) is compensated so as to maintain an efficiency of said combustion engine or gas turbine (7).

4. The method of claim 3, wherein said exhaust fan (35b) starts a rotation in said exhaust gas (77), said rotation being reinforced by fixed guide vanes (36) arranged after said inlet (35a) to said process unit (17).

5. The method of claim 1, wherein said exhaust (77) and said coaxial feed pipe (67) have directions of rotation that are opposite each other in order to increase a degree of mixing between exhaust (77) and added fluid (30, 47).

6. The method according to claim 1, wherein NH₄OH enters through said lower swivel (46) to a central, coaxial inner pipe (47) in said coaxial feed pipe (67), said coaxial inner pipe (47) being surrounded by a mantle of salt water (30) and in which inner pipe (47) NH₄OH is guided out through pipes (69) to seawater ring nozzles (42) of said coaxial feed pipe (67), for mixing of NH₄OH and seawater in said nozzles (42) during flushing of said NH₄OH and said seawater from said nozzles (42), so as to change said exhaust (77) which gradually changes to CO₂-lean exhaust (13).

7. The method according to claim 6, further comprising an NH₄OH-radial distributor (70) arranged just outside said nozzles (42).

8. The method of claim 1, wherein precipitated material of NaHCO₃, NH₄Cl and H₂O are guided to a precipitator (22) for separating H₂O from NaHCO₃ and NH₄Cl.

9. The method of claim 8, wherein said precipitator (22) is vertically cylindric, having a tangential inlet (25b) for said NaHCO₃ and NH₄ Cl to be precipitated by rotation and gravity toward a bottom of said precipitator (22).

10. The method according to claim 9, wherein fresh water is let out through a fresh water overflow pipe (75) to a fresh water and filter tank (62).

11. The method according to claim 10, wherein said fresh water (74) from said filter tank (62) is allowed to pass through a filter (61) to a distribution tank/settling tank (60).

12. The method of claim 10, wherein salt containing water from a bottom of said settling tank (60) is lifted back to a seawater pipe (30) using a pump (53).

13. The method of claim 11, wherein fresh water (74) is pumped by means of a pump (54) to a storage tank (59), and further from said storage tank (59) via a discharge pump (58) to a booster or export pump (56) to an export pipeline (14).

14. The method of claim 9, wherein said precipitated $NH_4Cl$ and $NaHCO_3$ are lifted up by means of a screw pump being driven by a motor (50), to an outlet (76) from said precipitator (22) to a refining processing compartment (60).

15. The method of claim 14, wherein the screw pump is an Archimedes screw (51).

16. The method of claim 1, wherein limestone, $Ca(OH)_2$, is fed into a process unit (20) for regenerating ammonia, $NH_3$, the ammonia further being guided to a mixing unit (32) via a pipe (19) for mixing with additional $NH_3$ (2), so as to mix salt water and ammonia (2, 19) and pump said mixture of $NH_4OH$ into said feed pipe (67) in said process unit (17).

17. A method according to claim 1, wherein said combustion engine or gas turbine (7) drives a generator (9) and a steam driven generator (31) for generating electrical energy which is partially exported as energy (15) and partially used for pumping work, gas and $CO_2$ export work, and heating of $H_2O$ in a process unit (24) that precipitates soda/$Na_2CO_3$ (12) for export, and $CO_2$ and fresh water which is exported or partly returned to the process.

18. The method of claim 1, wherein the salt water is sea water.

19. A method for desalinating salt water (5), and for removing $CO_2$ from a $CO_2$-rich exhaust (77) from a combustion engine or gas turbine (7), comprising the following steps:

liquefied natural gas, LNG (4), is fed into a heat exchanger (6) in which said LNG (4) receives heat from combustion air (3) from the atmosphere, said combustion air being provided via a line (28) to an air inlet (33) of said combustion engine or gas turbine (7);

said heat exchanger (6) evaporating said LNG (4) to gaseous form (29), said gaseous form (29) being guided to a fuel gas skid (8) for supplying fuel to said combustion engine or gas turbine (7);

in which said combustion air (28) which, at said air inlet (33) to said gas turbine (7), has a lowered temperature relative to said air (3) before said heat exchanger (6), and thus increases the efficiency of said combustion engine or gas turbine (7);

in which $CO_2$-rich exhaust (77) from said combustion engine or gas turbine (7) is guided into a process unit (17) having an inlet (35a) with a fan (35b) and an outlet (79a) for exhaust (13) of reduced $CO_2$ content;

in which said salt water (5, 30) is guided into said process unit (17), via a coaxial feed pipe (67) for seawater and $NH_4OH$ feed; and into which $NH_4OH$ is guided via said coaxial feed pipe (67) and mixed with said salt water (30) and released from said coaxial feed pipe (67) to flowing exhaust (13) of said process unit (17);

thus achieving a mixture of $NH_4OH$-containing salt water and $CO_2$-rich exhaust (77) for removing CO2 from said exhaust (77), thereby producing said $CO_2$-lean exhaust (13) and fresh water.

20. The method of claim 19, wherein said LNG (4) in said heat exchanger (6) also receives heat from said salt water (5) that becomes cooled salt water (30), said cooled salt water (30) from said heat exchanger (6) is guided into said process unit (17) via said coaxial feed pipe (67) for seawater and $NH_4OH$ feed.

21. The method of claim 20, said coaxial feed pipe (67) being arranged in a centre line of said process unit (17).

22. The method of claim 19, wherein said salt water (5, 30) is fed into said coaxial feed pipe (67) via an upper swivel (40) having rotation vanes for rotating said coaxial pipe (67).

23. The method of claim 19, wherein $NH_4OH$ is guided via a lower swivel (46) on said coaxial feed pipe (67) and mixed with said cooled salt water (30) and released from said coaxial feed pipe (67) via a series of nozzles (42) arranged in several vertical levels, to upwardly flowing and rotating exhaust (13) of said process unit (17).

24. The method of claim 19, wherein said LNG (4) in said heat exchanger (6) also receives heat from steam (27) generated from a steam turbine (31).

25. The method of claim 19, wherein said heat exchanger (6) evaporating said LNG (4) to gaseous form (29), said gas (29) being guided to a gas export module (10).

26. The method according to claim 19, wherein the exhaust flow through said process unit (17) is provided an increasing diameter with increasing elevation from said inlet (35a) to said outlet (79a), and with draining guide gutters (38) to drains (43) leading to outlets (45) and further to a collector tank (48) for the process unit's (17) products $NaHCO_3$, $NH_4Cl$ and $H_2O$.

27. The method according to claim 19, wherein said salt water (5) is seawater.

28. The method according to claim 19, said process resulting in the formation of $NaHCO_3$, $NH_4Cl$ and fresh water.

29. A method for desalinating salt water (5) and removing $CO_2$ from a $CO_2$-rich exhaust (77) from a combustion engine or gas turbine (7), comprising the following steps:

LNG (4) is fed into a heat exchanger (6) in which said LNG (4) receives heat from said salt water (5) that becomes cooled salt water (30), and for evaporating said LNG (4) to gas (29) being guided to a fuel gas skid (8) for supplying fuel to said combustion engine or gas turbine (7);

said $CO_2$-rich exhaust (77) from said combustion engine or gas turbine (7) is guided into a process unit (17) having an inlet (35a) with a fan (35b) and an outlet (79a) for $CO_2$ reduced exhaust (13);

said cooled salt water (30) from said combustion engine or heat exchanger (6) is guided into said process unit (17) having a feed pipe (67) for seawater and $NH_4OH$, said feed pipe having nozzles inside said process unit (17);

in which $NH_4OH$ is fed through said feed pipe (67) and mixed with said cooled salt water (30) and released from said feed pipe (67) to said process unit's (17) through flowing $CO_2$-containing exhaust (77);

thus achieving a mixture of $NH_4OH$-containing salt water and said $CO_2$-rich exhaust (77), for formation of fresh water and releasing said $CO_2$-reduced exhaust (13) to the atmosphere.

30. The method of claim 29, wherein, in addition to formation of fresh water, $NaHCO_3$ and $NH_4Cl$ are formed in said process unit (17).

31. The method of claim 29, wherein said LNG (4) in said heat exchanger (6) receives heat from steam (27) from a steam turbine (31).

32. The method of claim 29, wherein said heat exchanger (6) is evaporating said LNG (4) to gas (29) that partially is guided to a gas export module (10).

33. The method of claim 29, wherein said LNG (4) in said heat exchanger (6) receives heat from combustion air (3) which thus is cooled and fed via a line (28) to an air inlet (33) to said combustion engine or gas turbine (7).

34. The method of claim 33, wherein said combustion air (28) which, at said air inlet (33) to said gas turbine, has a lowered temperature due to giving heat to said LNG (4) on its way through said heat exchanger (6), and thus becomes more dense and thus increases the efficiency for said combustion engine or gas turbine (7).

35. The method of claim 29, wherein said coaxial feed pipe (67) is arranged in a center line of said process unit (17).

36. The method of claim 29, wherein $NH_4OH$ is guided in via a lower swivel (46) on said coaxial feed pipe (67) and mixed with said cooled salt water (30) and released via a series of nozzles (42) in several vertical levels from said feed pipe (67) to said process unit's $CO_2$-reduced exhaust (13), wherein said $CO_2$-reduced exhaust (13) is upward flowing and rotating.

* * * * *